INVENTOR.
WILLIAM C. CHRISTIE

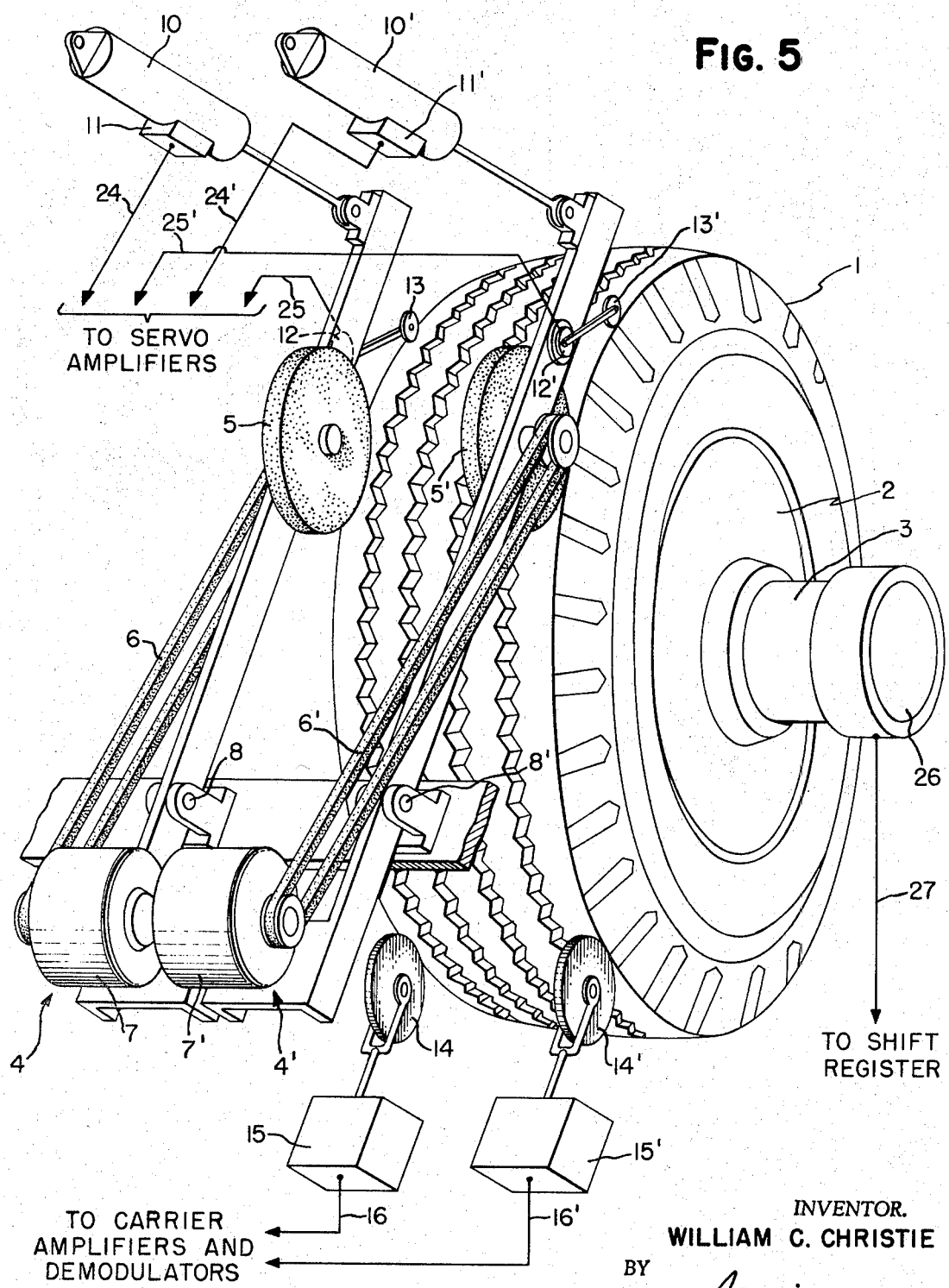

United States Patent Office 3,553,903
Patented Jan. 12, 1971

3,553,903
CONTROL SYSTEM FOR A TIRE GRINDING MACHINE
William C. Christie, Mogadore, Ohio, assignor to The Goodyear Tire & Rubber Company, Akron, Ohio, a corporation of Ohio
Filed July 31, 1967, Ser. No. 657,391
Int. Cl. B24b 49/00
U.S. Cl. 51—165                    18 Claims

ABSTRACT OF THE DISCLOSURE

A control system for a tire grinding machine which selectively grinds off portions of the tire tread to correct variations in force around the circumference of the tire. The control system generates electrical signals proportional to force variations detected by a force transducer and stores the signals in a memory circuit for transmission through a shift register delay circuit to a servo mechanism which moves a grinding wheel to and from the tire.

BACKGROUND OF THE INVENTION

There are many types of tire grinding machines known in the prior art. Some of these grinders remove the tread from the carcass in preparation for retreading the tire. Other tire grinding machines are often referred to as tire truing machines. Such machines are used to correct irregularities in the circumferential contour of the tire and thereby provide a smoother riding tire which will wear more uniformly. Many of these tire truing machines are primarily concerned with correcting variations in the radial run-out of the tire. In other words, some tires may be "out of round" or have humps or irregular portions on the tread surface which cause the tire to thump or vibrate and thereby transmit undesirable vibrtaions to the vehicle on which the tire is used. Tire truing machines of the type described above have long been used to correct such undesirable irregularities on the tire by grinding off the high spots on the tire and ensuring that the tire is perfectly round.

It has also long been recognized that when a tire is subjected to dynamic load conditions that exist when a tire is used on a vehicle or rotated against a load roller, the radial and lateral force exerted by the tire may often vary somewhat throughout the circumference of the tire. These variations in force may also cause tire thump, vibration, and rough riding characteristics. Such force variations are known to be caused by a number of factors such as variation in cord angle of the reinforcing plies of the tire, variation in tread thickness, greater cord elongation in some areas than in others, and certain other factors which may occur during the curing of the tire in the mold. The above-mentioned factors tend to create in the tire some areas which are weaker and some which are stronger than others. When the tire is inflated, greater force is normally exerted by the stronger areas and lesser force is exerted by the weaker areas. Since it is impractical to attempt in some way to strengthen the weaker areas to balance the variation in force, the most logical technique is to slightly weaken the stronger areas of the tire by grinding away a small portion of the tread thickness in the stronger areas of the tire which give the highest force measurement and thereby decrease their force measurement to correspond with the areas initially giving a lower force measurement.

One of the primary difficulties encountered in the past in ginding tires to correct force variation has been the problem of converting the force variation measurements to some form of usable control signal which can be stored by a memory device and automatically used when needed to control a grinding mechanism for removing a portion of the tire tread in the proper location around the circumference of the tire to properly balance the radial and lateral force exerted by the tire. Many of the prior devices used for this purpose have required manual adjustments of the tire grinding equipment determined by visual displays indicating the location of variation in force around the circumference of the tire. Such techniques have been too inaccurate and time consuming to profitably be used on a production basis.

OBJECTS OF THE INVENTION

It is a primary object of this invention to overcome the difficulties of these prior devices by providing a control system which automatically senses the force variation throughout the circumference of the tire and controls the movement of the grinder to selectively grind portions of the tire in a pattern which will properly balance the force variation throughout the entire circumference of the tire.

Another important object of this invention is to provide a control system which operates rapidly and accurately and with a minimum of manual adjustments.

A still further object of this invention is to eliminate cumbersome mechanical control mechanisms which may involve frequent breakdowns and require extensive maintenance.

These and other objects of the invention will be more readily understood by referring to the following specification and accompanying drawings, wherein:

FIG. 5 is a perspective view showing the apparatus of invention similar to FIG. 1 but illustrating a dual system of force measuring wheels and grinding wheel assemblies.

Figure 1:
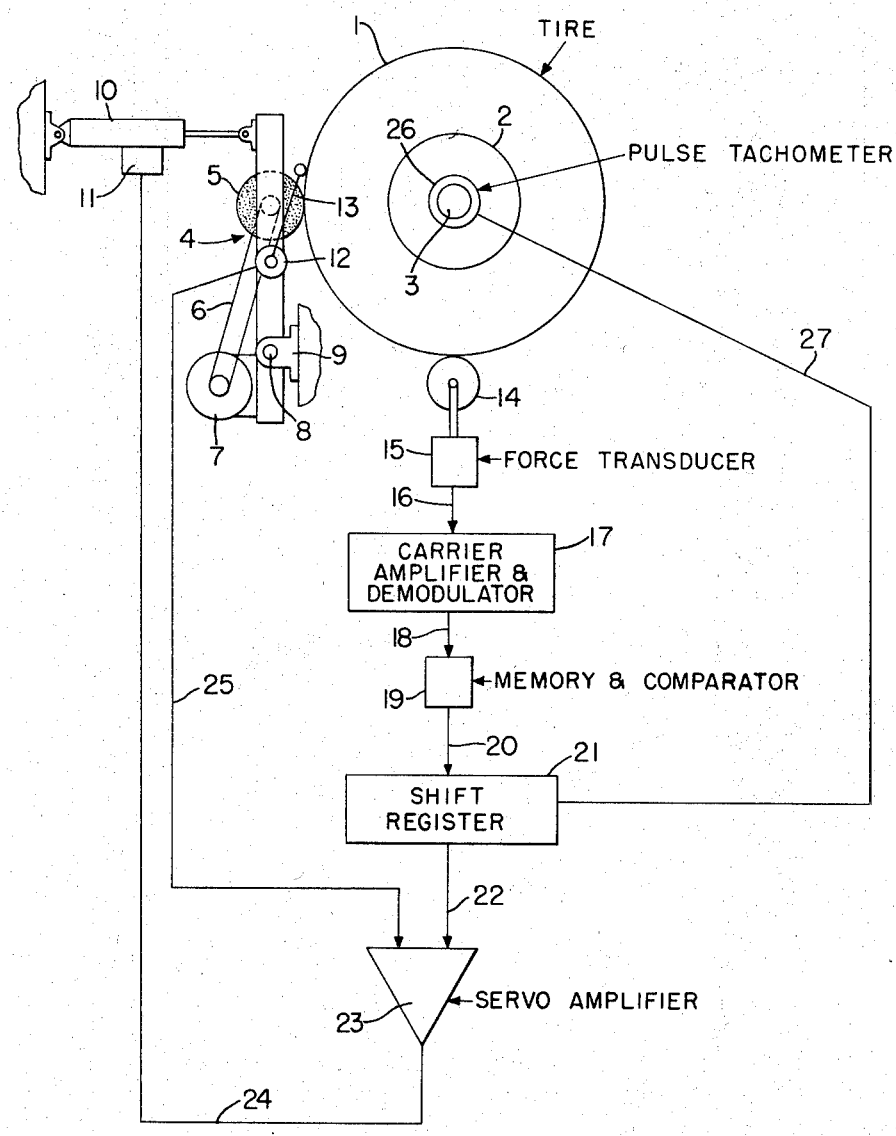
FIG. 1 is a block diagram of the overall area of the control system as used in conjunction with a tire grinding machine.

Referring now to FIG. 1, an inflated tire 1 is mounted on a wheel 2 which in turn is rotatably mounted on a spindle 3 for rotation about its axis. The spindle 3 may be supported by a frame structure (not shown) which is typical of many conventional tire grinding machines. An example of such a machine may be seen in either Pat. No. 2,769,283 or No. 2,787,089. These patents also show some typical ways of mounting the tire grinding wheel and since this invention is concerned primarily with the electrical control system for a grinding machine rather than the mechanical apparatus, the mechanical structure of the machine will not be shown in detail but will be indicated merely schematically to illustrate the manner in which it is connected to the electrical control system. In FIG. 1, a grinder wheel assembly 4 rotatably carries a grinder wheel 5 driven by a belt 6 connected to a motor 7. The grinder wheel assembly 4 is pivotally connected by a pin 8 to a support arm 9 which in turn is mounted on the frame of the grinder (not shown). The grinder wheel assembly 4 is moved to and from the tire 1 by a servo cylinder 10 controlled by a servo valve 11. The grinder wheel assembly 4 also carries a position sensor transducer 12 having a tire follower arm 13, the operation of which will be described later in further detail. A load roller 14 is positioned to bear against the periphery of the tire 1 and is carried by a force transducer 15 which senses the force variation around the circumference of the tire 1 as it is rotated against the roller 14. The force transducer 15 emits a signal through line 16 to a carrier amplifier and demodulator 17 which amplifies and demodulates the signal from the force transducer 15 and transmits this signal through line 18 to a memory and comparator circuit 19. The operation of the memory and comparator circuit 19 will be described in greater detail further in the specification. Described in simplest terms, the memory and comparator circuit 19 selects certain portions of the signal received from the carrier amplifier 17 and stores them temporarily until they are passed through line 20 to a 100 bit shift register 21 which serves as a delay circuit to retard the passage of the signal from line 20 to line 22 which is connected to the input of a servo amplifier 23. The servo amplifier 23 sends an output signal through line 24 to the servo valve 11 which controls the servo cylinder 10. A feed-back line 25 from the position sensor 12 passes a signal to the servo amplifier 23 which modifies the effect of the signal received through line 22 by the servo amplifier 23. The purpose of the position sensor 12 is to control the distance of the grinding wheel 5 from the tire 1 and prevent the grinding wheel from grinding off irregularities in the tire due to variations in radial runout rather than force variations. In other words, the feedback from the position sensor 12 through line 25 to the servo amplifier 23 causes the servo cylinder 10 to hold the grinding wheel 5 a short distance from the tire 1 unless grinding is required to correct the force variation in any given position on the tire as it passes the location of the grinding wheel. The amount of delay caused by the shift register 21 is controlled by a pulse tachometer 26 which is associated with the spindle 3. The pulse tachometer used may be a conventional Veeder Root Series 182100 with an output buffer. The pulse tachometer 26 transmits 100 pulses through the line 27 to the shift register 21 each time the tire rotates 90° about its axis. Each pulse from the pulse tachometer 26 causes the shift register 21 to shift the signal to a new location in the register. The shift register 21 is designed to accommodate one hundred shifts from the time a signal enters the register until it leaves the register. This causes a signal which has entered the register to pass through the register during the time in which the tire rotates 90°.

Figure 2:
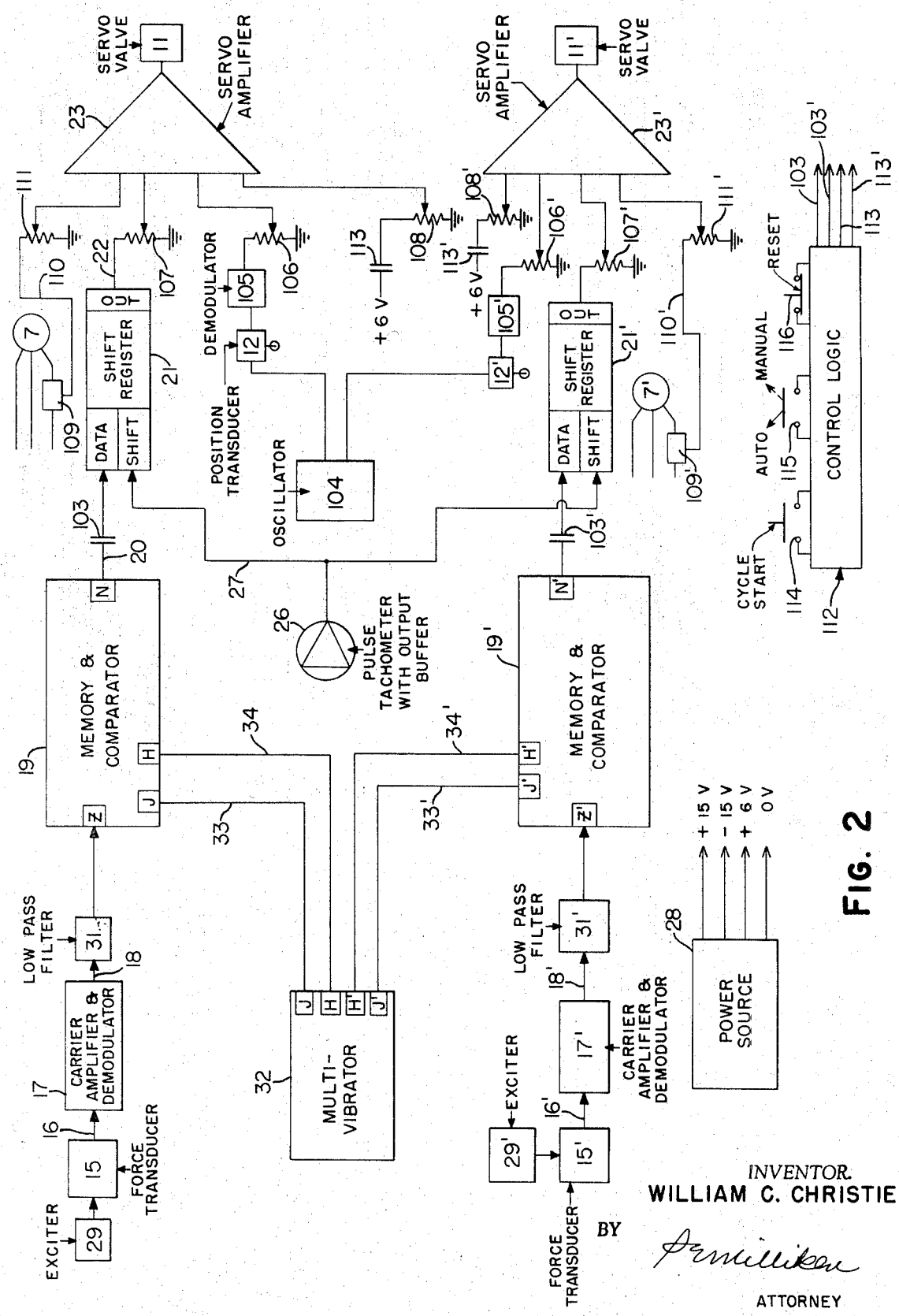
FIG. 2 is a more detailed block diagram of the control system shown in FIG. 1.

FIG. 2 shows essentially the same overall control system as FIG. 1 but is more detailed with regard to the specific components used and shows a dual control system whereby a load roller 14 may be provided to bear against each shoulder of the tire to separately measure the force variation on each side of the tire. When two force rollers are used, a dual circuit is provided, as shown in FIG. 2, with separate servo amplifiers which operate separate grinding wheels on each shoulder rib of the tire. To simplify the description of the dual circuit in FIG. 2, one circuit will be identified by a series of numerals and the comparable circuit components will be identified by the same numerals but with the designation of prime after each numeral. For example, the force transducers in the dual system will be identified as 15 and 15'. Only one of the dual circuits shown in FIG. 2 will be described and it may be assumed that the other dual circuit will be identical. The only difference in the operation of the two circuits is that if the roller on one shoulder of the tire senses a higher force than the opposite roller, the circuit will signal the grinder wheel to grind off more of the tread where the force is highest.

It will be understood that the various components in FIG. 2 will receive a required current for operation from a power source 28 which supplies +15 v., −15 v., +6 v., and 0 v. To simplify the description, lead lines from the power source have been omitted since this involves conventional circuitry techniques which are well known in the art.

The force transducer 15 has an exciter 29 connected thereto, the output of which is modulated by the signals generated in the force transducer. The exciter is a conventional high frequency oscillator. The carrier amplifier and demodulator 17 converts an AC current received from the transducer 15 to a DC current which is passed through line 18 to the input terminal Z of the memory and comparator 19. A conventional low pass filter 31 may be connected into line 18 between the carrier amplifier 17 and the memory and comparator 19 to prevent unwanted noise and interference signals from passing to the memory and comparator 19. A multivibrator circuit 32 is connected to the memory 19 by a line 33 joined at each end to connecting terminals J and by line 34 joined at each end to connecting terminals H to provide a means of refreshing the memory. Similarly, the multivibrator 32 is joined to the other memory and comparator 19' by line 33' joined to terminals J' and line 34' joined to terminals H'. The detailed circuitry of the memory and comparator 19 and 19' are identical and are shown in detail in FIG. 3.

Both memory and comparator circuits comprise an input buffer amplifier 35, a reference voltage circuit 36, a peak memory 37, a second identical peak memory 38, a comparator 39, and an output buffer circuit 40.

The signals from the carrier amplifier 17 enter the memory and comparator 19 through the input terminal Z of the input buffer amplifier 35 and then pass through a resistor 41 to the input 42 of an amplifier 43. The amplifier 43 has a resistor 44 and a capacitor 45 connected in parallel between the input 42 and the output 46 of the amplifier 43. The output 46 of the input buffer amplifier 35 is connected to the input 47 of peak memory 37, the input 48 of peak memory 38, and an input 49 of comparator 39. Since the peak memories 37 and 38 are identical, identical numerals will be used to describe all the components thereof except the inputs and outputs. Each of the respective inputs 47 and 48 of peak memories 37 and 38 passes through a resistor 50 in the respective memory to which it is connected and then to the input 52 of an amplifier 53. A diode 54 is connected between the input 52 and an output 55 of amplifier 53. The output 55 is also connected to a diode 56 which is joined by a line 57 to a field effect transistor 58. Connected to line 57 between the diode 56 and the transistor 58 is one end of a resistor 59, the other end of which is connected to a capacitor 60 which, in turn, is connected to ground. Between the resistor 59 and the capacitor 60 connecting terminal J is tapped into the line in the peak memory 37 and terminal H is tapped into the line in the peak memory 38 to provide connections respectively through lines 33 and 34 to corresponding terminals J and H on the multivibrator 32. A −15 v. line 61 is connected through a resistor 62 and then through transistor 58 to ground. A −15 v. line 63 is connected through a resistor 64 and then through a PNP transistor 65 to outputs 66 and 67 of the peak memories 37 and 38 respectively. Connected between the input 52 of the amplifier 53 in each of the peak memories and the respective outputs 66 and 67 is a resistor 68. A line 69 connects the output of the reference voltage circuit 36 through a resistor 71 to the input 52 of the amplifier 53. The reference voltage circuit 36 receives a +6 v. from the power source 28 and passes it through a resistor 72 to provide a reduced voltage of +4 v. at a terminal point 73. The +4 voltage passes through resistor 71 in line 69 to the input 52 in both the peak memories 37 and 38. A variable resistor 74, indicated by broken lines in the reference voltage 36, is used to adjust the voltage passing through a line 75 to an input 76 of the comparator 39. The voltage on line 75 represents an acceptance level which determines how much variation in force will be tolerated around the tire circumference before the grinder wheel of the machine will be actuated. The output 66 of peak memory 37 is connected to a line 77 through a diode 78 which serves as an input to comparator 39. The output 67 of peak memory 38 is also connected to line 77 through a diode 79. Comparator input lines 49, 76, and 77 are connected through resistors 80, 81, and 82 respectively to an input 83 of an amplifier 84. A capacitor 85 is connected between the input 83 and an output 86 of the amplifier 84. A resistor 87 is connected into the output 86 from the amplifier 84. The output 86 connects to the output buffer 40. A positive voltage at line 86 (corresponding to a grind signal) enters the output buffer 40 through resistor 87 and diode 88, thereby causing a positive voltage to occur at line 89. This turns on the NPN transistor 90 and line 91 is reduced to zero volts. This is transferred through resistor 92 and diode 93 to the base of transistor 94 which turns off the transistor and isolates line 100 from ground and allows the +6 v. on line 95 to be transferred through resistor 96 to line 100. A resistor 97 is connected into line 95 to regulate the voltage to line 91. Resistors 98 and 99 reference the bases of transistors 90 and 94 respectively to ground. A negative voltage at line 86 (corresponding to the absence of a grind signal) results in zero voltage occurring at line 89. This causes transistor 90 to turn off and line 91 to become positive. This in turn causes a positive voltage at the base of transistor 94, turning it on and thereby reducing line 100 to zero volts. The output line 100 of the output buffer 40 also forms the output for the entire memory and comparator 19 to which line 20 is connected at terminal N. A +6 v. signal at the output 100 corresponds to a grind on signal and zero volts to an off signal. Connected into the line 20 is a normally open control relay 103 which controls the passage of signals from the memory and comparator 19 to the shift register 21. An identical relay 103' controls the passage of signals from the memory and comparators 19' to the shift register 21'.

The pulse tachometer 26, as previously explained, generates pulses which are passed through the line 27 to the shift registers 21 and 21' to cause the signal fed into the shift register to shift positions at each pulse until they pass from the output line 22 of the shift register to servo amplifiers 23 and 23' to operate servo valves 11 and 11' and move the grinder wheel 5 to the desired position, as previously described. An oscillator 104 provides excitation for the position transducers 12 and 12', each of which senses the relative position of the respective grinder assembly on which it is mounted and passes an output through demodulator 105 or 105'. A variable resistor 106 may be used between the demodulator 105 and the amplifier 23 to adjust the effect of the transducer output on the amplifier 23. Similarly, a variable resistor 107 may be used between the shift register 21 and the amplifier 23, and a variable resistor 108 may be used in the +6 v. line to the amplifier 23. A feed-back current may be obtained by a current sensor 109 which senses the load on the grinder motor 7 and provides an output which is transmitted through feed-back line 110 and variable resistor 111 to the servo amplifier 23. The variable resistor 111 is an adjustment similar to resistors 106, 107, and 108.

Included in FIG. 2 is a control logic circuit indicated generally by the numeral 112. It consists of conventional relays and timers which are connected together in a manner, well known in the art, to perform basic timing and switching functions required to operate the control relays 103 and 103' and relays 113 and 113' which send a signal to the servo amplifiers 23 and 23' to position each grinder wheel 5 near the tire. The control logic has a cycle start switch 114, an auto-manual switch 115, and a reset switch 116. The cycle start switch 114 is used to initiate the first cycle of the machine wherein the force variations are sensed by the force transducers and the grinding wheel is automatically positioned to grind the proper locations on the tire to properly balance the force around the circumference of the tire. The auto-manual switch 115 may be positioned to allow the machine to operate automatically once it is started or to require stopping the machine by pressing the reset button 116.

OPERATION

In the operation of this tire grinding machine, the inflated tire 1 is rotatably mounted on a spindle 3 with a load roller 14 bearing against the periphery of the tire, the tire is rotated about its axis, and the cycle start switch 114 is pressed. This causes a signal from the control logic to close control relays 113 and 113' thereby sending a signal to servo amplifiers 23 and 23' which cause the grinder wheels 5 to be moved into a position near the periphery of the tire. Simultaneously, a time-delay relay in the control logic 112 permits the tire to complete one complete revolution before the grinder wheel 5 is moved to grinding engagement with the tire 1. During this first revolution of the tire, the load roller 14 is in contact with the periphery of the tire and the force transducer 15, in response to force on the roller 14, measures the force variation around the circumference of the tire and transmits signals to the carrier amplifier and demodulator which, in turn, are transmitted to the memory and comparator 19. The low force signal is memorized and compared to the progressing force signal. When they differ by a predetermined amount, a grind signal is generated at line 20 and fed into the data input of the shift register 21 through relay 103.

Figure 3:
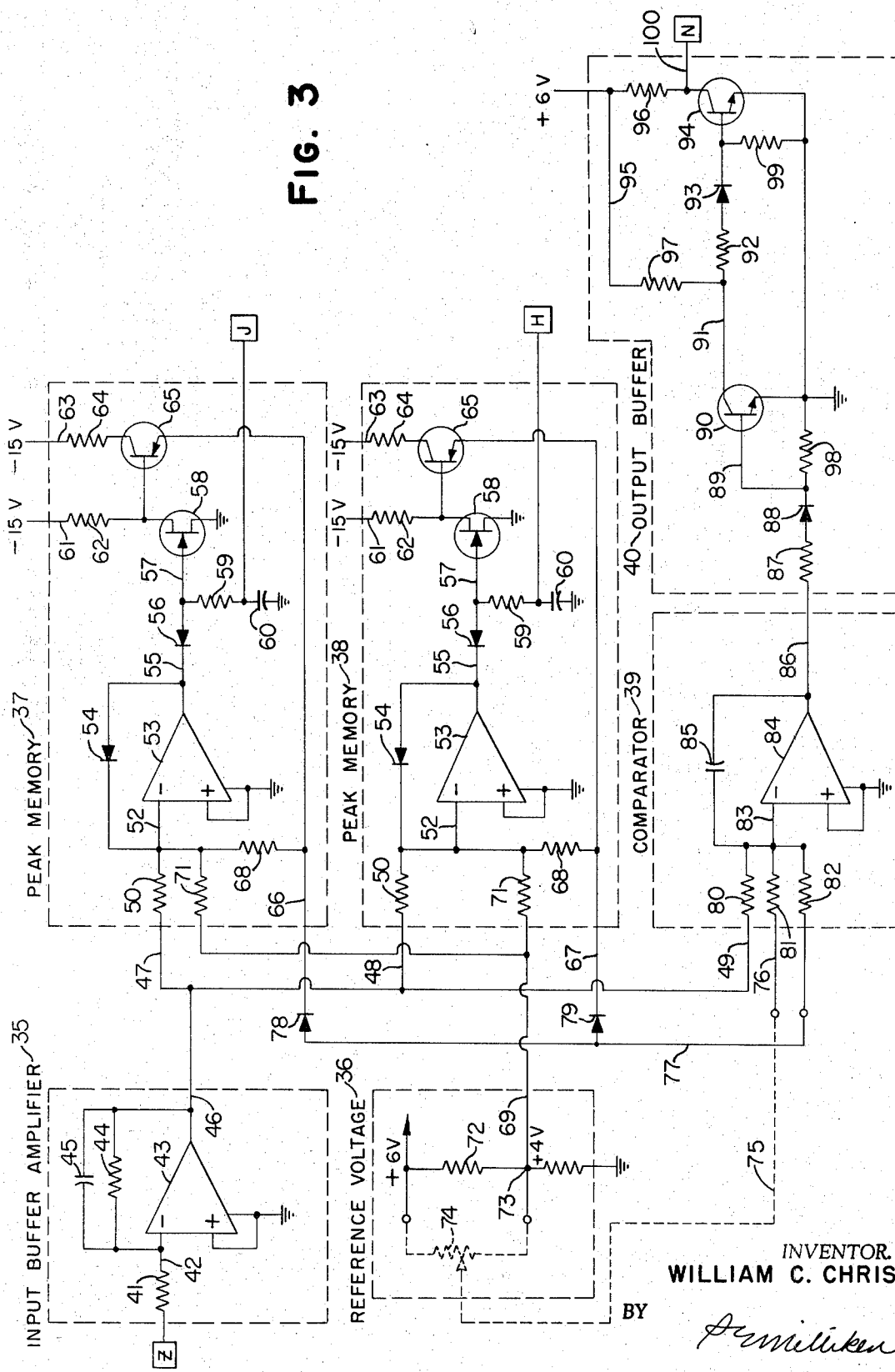
FIG. 3 is a detailed circuit diagram of the memory and comparator circuit of this invention.

The memorizing and comparing operation is best explained by referring to FIG. 3. The demodulated force signal enters the memory and comparator 19 through the input buffer amplifier 35. Here the signal is amplified and inverted so that the highest voltage at line 46 corresponds to the lowest force on the load roll 14. This inverted signal is fed into two peak memories 37 and 38 and a comparator 39. Since the operation of peak memories 37 and 38 is identical, the discussion of 37 will apply to both 37 and 38. Let us assume initially that the voltage on capacitor 60 is zero. Then the gate of the field effect transistor 58 will have zero volts on it, making the effective resistance across the transistor 58 low. This in turn will cause a low negative voltage to occur at the base of the PNP transistor 65. The emitter follower action of the transistor 65 will cause the same low negative voltage to occur at its emitter, line 66. This low negative voltage is summed algebraically through resistor 68 with +4 v. through resistor 71 and the inverted force signal through resistor 50 (assuming resistors 50, 68, and 71 to have the same value). If the result is positive, it will cause a negative voltage at the output of the operational amplifier 53 at line 55 which will pass through the diode 56 causing a negative voltage at the gate of the field effect transistor thereby increasing its resistance and ultimately increasing the negative voltage at line 66. The output of amplifier 53 will become increasingly negative until the magnitude of the negative voltage at line 66 is sufficient to cause the sum mentioned above to approach zero. The negative voltage at 66 will attain its greatest magnitude when the inverted force signal is at its positive peak (corresponding to a low force peak). The output of the amplifier 53 corresponding to this peak will be stored on capacitor 60 and isolated from a less negative output by the diode 56. Thus the voltage on the gate of the field effect transistor and likewise the voltage at line 66 will be maintained at the values corresponding to the positive voltage peak of the inverted force signal. If the inverted force signal falls below its positive peak, the algebraic sum mentioned above will become negative and the output of the amplifier 53 will become positive enough to null the input through diode 54 to keep the amplifier 53 from saturating.

Since the low force peak is apt to drift during the grinding cycle, the memorized voltage must be periodically refreshed. This is accomplished through the use of the two memories 37 and 38 and a multivibrator circuit 32. The mutivibrator 32 has a period equal to the time it takes to make approximately 2.2 revolutions of the tire. The circuit is arranged so that every cycle the capacitor 60 of peak memories 37 and 38 is at the proper value corre by reducing the memory output, line 66, to a low negative voltage. During the next half-period, the tire will rotate somewhat more than a full revolution, allowing the peak memory 37 to attain an output corresponding to the low force peak of the tire. At the end of this half-period, the capacitor 60 of the other peak memory 38 is shorted to ground, thereby reducing its output, line 67, to a low negative voltage, the magnitude of which will increase to the proper value during the completion of this period. Thus at any given time during a full period one of the peak memories 37 and 38 is at the proper value corresponding to the low force peak and each of them is reset once during a full period.

The diodes 78 and 79 isolate the outputs of the two memories 37 and 38 and cause the comparator 39 to look only at the output greatest in magnitude. In other words, line 77 assumes the voltage of line 66 or line 67 whichever is more negative. Thus line 77 is always at a voltage corresponding to a low force peak no older than one period of the multivibrator 32.

Figure 4:
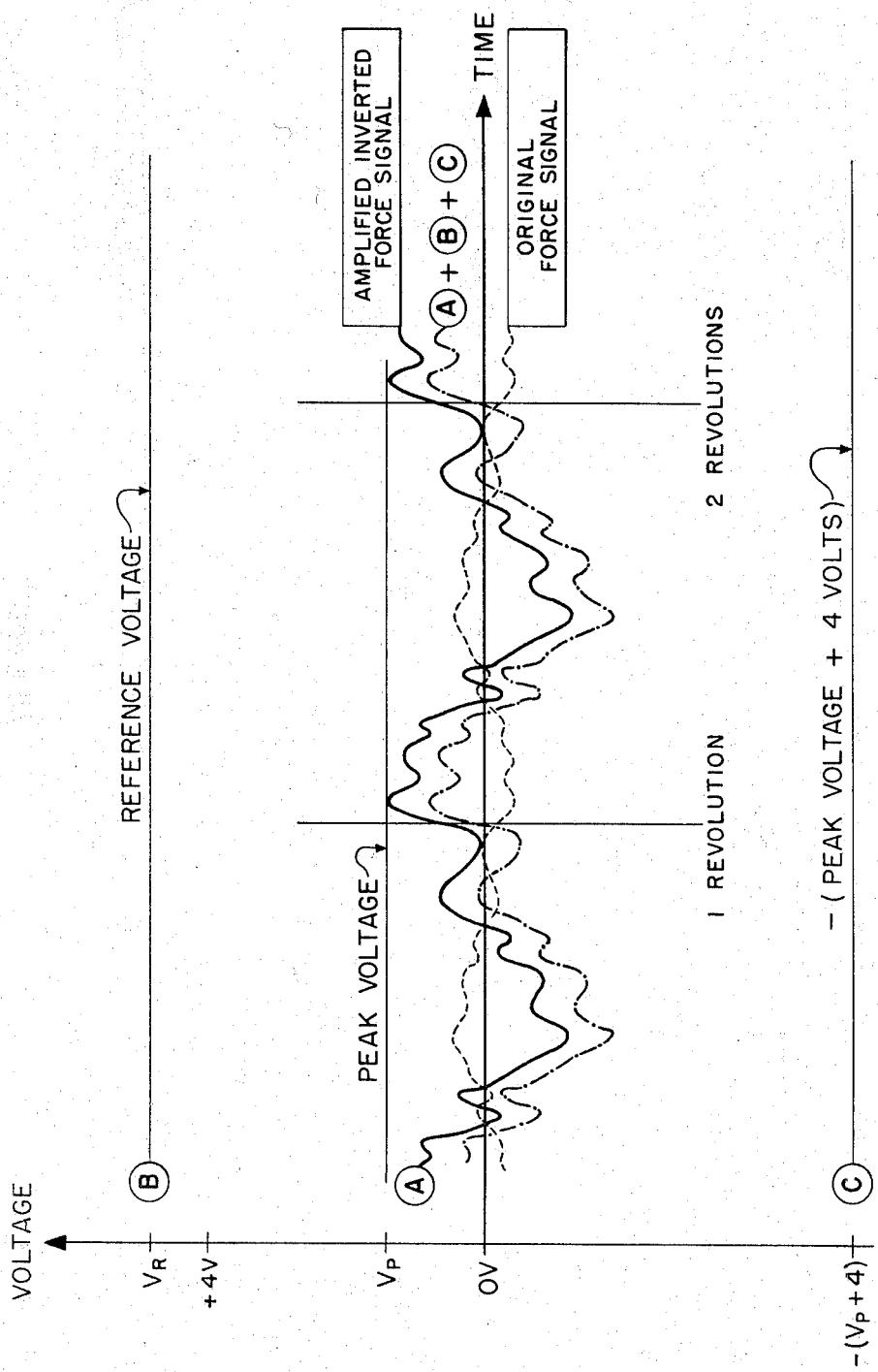
FIG. 4 is a chart showing a visual indication of the signals being compared in the comparator circuit and the resultant output signals.

In describing the operation of the comparator 39 we will refer to FIGS. 3 and 4. The comparator 39 has three inputs, lines 49, 76, and 77 through resistors 80, 81, and 82 respectively. Typical input voltages are plotted in FIG. 4 and identified as curves (A) (amplified inverted force signal), (B) (REFERENCE VOLTAGE), and (C) (minus the sum of the peak voltage and +4 volts). If the algebraic sum of these input voltages is positive, amplifier 84 saturates in the negative direction. The condition corresponds to an acceptable force level. If however, the algebraic sum is negative, the amplifier 84 saturates in the positive direction and a grind signal is generated as described in the discussion of the output buffer 40. The reference voltage is adjustable from +4 v. to +6 v. by means of the potentiometer 74. In this manner the acceptable force level can be set for a desired degree of uniformity.

The pulse tachometer 26 transmits pulses to the shift register 21 and thereby delays the passage of signals from the memory and comparator 19 to the servo amplifier 23 until the tire has rotated from the position where it is sensed by the load roller 14 to a position beneath the grinder wheel 5. This delay is necessary since the grinder wheel is offset 90° around the circumference of the tire from the load roller 14.

Upon each rotation of the tire, the force variation measurements are transmitted to the memory and comparator 19 where the signal generated by the lowest force reading is stored and compared to the progressing force signal and the resultant signal is used to control the position of the grinder wheel 5. As the tire continues to rotate, the grinder will continue to grind in locations on the tire producing high force measurements until such time as the force variation measurements indicate that no further grinding is needed to provide uniform force around the circumference of the tire. When this point is reached, no further signals will be transmitted from the memory and comparator 19, and the signals to the servo amplifier 23 will cause the servo cylinder to hold the grinder wheel 5 out of contact with the tire.

FIG. 5 illustrates an apparatus similar to that shown in FIG. 1 except that two separate grinder wheel assemblies 4 and 4' and two separate load rollers 14 and 14' are used on each side of the tire along the shoulder rib. Since the structure and operation of the dual apparatus is substantially identical to that previously described for the single apparatus shown in FIG. 1, no further detailed description will be given. The parts of the apparatus used on the left shoulder rib of the tire are numbered identical to the parts shown in FIG. 1. The similar parts used on the right shoulder of the tire are given the same numbers as those on the left but are designated with a prime to distinguish them from the parts used on the left side. In the arrangement shown in FIG. 5, the load rollers 14 and 14' and the grinder wheel assemblies 4 and 4' operate independently of each other with the assembly 4 operated in response to signals received from the roller 14 and the assembly 4' operating in response to signals received from the roller 14'. Thus, it may be seen that if different force readings are taken on each shoulder rib of the tire, the amount of grinding and the location of the grinding may vary from one shoulder rib of the tire to the other. This arrangement gives an even finer degree of accuracy in correcting the force variation in the tire.

It will be understood that certain conditions described herein, such as the number of pulses transmitted by the tachometer during each revolution of the tire, the amount of offset between the load roller and the grinder wheel, the number of grinder wheels and load rollers used and such details of mechanical arrangement are merely matters of choice and may vary without departing from the scope of this invention.

What is claimed is:

1. The combination of a tire grinding machine and a control system therefor comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, the improvement comprising:

(A) means for generating electrical signals representative of force variations around the circumference of a tire and including transducer means engaging the tire, (B) a memory circuit for storing signals from the generating means, said memory circuit having two individual memory units which are arranged to be alternately refreshed, one of which is refreshed with each successive revolution of the tire while the other memory unit emits an output signal in response to the information stored therein, and (C) an electrically controlled servo mechanism for moving the grinding wheel to and from a grinding position with respect to the tire in response to the output signal from the memory circuit.

2. The combination as claimed in claim 1 wherein the memory circuit is adapted to select and store the signal representative of the lowest force measurement taken during each revolution of the tire.

3. The combination as claimed in claim 2 including a means for correlating the transmission of the grind signal to the servo mechanism in response to the rotational position of the tire.

4. The combination as claimed in claim 3 wherein the correlating means comprises a delay circuit connecting the memory circuit and the servo mechanism to delay the transmission of the output signal from the memory circuit to the servo mechanism and a means for timing the operation of the delay circuit in response to the rotation of the tire.

5. The combination as claimed in claim 4 wherein the delay circuit is a shift register and the timing means is a pulse tachometer.

6. The combination as claimed in claim 5 including a multivibrator for controlling the rate at which the memory units are refreshed.

7. The combination as claimed in claim 1 wherein separate force variation measuring means are mounted adjacent to each shoulder rib of the tire and the individual signal from each measuring means respectively controls one of the grinding wheels adjacent each shoulder rib of the tire.

8. The combination of a tire grinding machine and a control system therefor comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, the improvement comprising:

(A) means for generating electrical signals in response to force variation measurements taken around the circumference of a tire, (B) a memory circuit for selecting and storing the signals from the generating means, representative of the lowest force measurement during each revolution of tire, (C) a comparator circuit for comparing the stored signal from the memory circuit with the varying signal from the signal generating means to provide an output grind signal when the stored signal and the varying signal differ by a predetermined amount, and (D) an electrically controlled servo mechanism for moving the grinding wheel to and from a grinding position with respect to the tire in response to the output grind signal from the comparator circuit.

9. The combination of a tire grinding machine and a control system therefor comprising a tire support spindle rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, the improvement comprising:

(A) means for measuring the force variation around the circumference of the tire during each revolution thereof, (B) means connected to the force measuring means for converting the force variation measurements to an electrical output signal having a voltage which varies in proportion to said force variations, (C) a memory circuit connected to the converting means for electrically selecting and storing the output signal representative of the lowest force measurement during each revolution of the tire, (D) a comparator circuit for comparing the stored signal from the memory circuit with the varying signal from the force measuring means to provide an output signal when the two input signals differ by a predetermined amount, (E) a grinder positioned adjacent the tire at a spaced circumferential distance from the force measuring means and movable to and from the tire, (F) an actuator for positioning the grinder with respect to the circumference of the tire, (G) a position sensor on the grinder to generate an electrical feed-back signal in response to the relative position of the grinder with respect to the tire, (H) a servo amplifier for regulating the actuator in response to an output signal from the comparator circuit and the feed-back signal from the position sensor, (I) tire rotation measuring means associated with the tire support spindle for measuring the distance of rotation of the tire, and (J) a shift register connected between the output of the comparator circuit and the input of the servo amplifier and actuated by the tire rotation measuring means to delay the transmission of the output signal from the comparator circuit to the servo amplifier a sufficient time to permit the tire to rotate the distance between the circumferential location of the force measuring means and the grinder, and thereby ensure that the tire is ground at the proper circumferential location as sensed by the force measuring means.

10. The combination as claimed in claim 9 wherein the memory circuit has two individual memory units which are arranged to be alternately refreshed, one of said memory units being refreshed with each successive revolution of the wheel while the other memory unit emits an output signal.

11. The combination of a tire grinding machine and a control system therefor comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, the improvement comprising:

(A) means for generating electrical signals representative of force variations around the circumference of a tire;

(B) a memory and comparator circuit for receiving signals from the generating means comprising:
(1) an input buffer amplifier,
(2) a reference voltage circuit,
(3) a pair of memory circuits, each connected to the output of the input buffer amplifier and the output of the reference voltage circuit,
(4) a comparator circuit having an input connected to an output of each of the memory circuits and an input connected to the reference voltage circuit, and
(5) an output buffer circuit having an input connected to the output of the comparator circuit;

(C) means alternately refreshing one of said memory circuits with each successive revolution of the wheel while the other memory circuit emits an output grind signal in response to the information stored therein; and (D) an electrically controlled servo mechanism for moving the grinding wheel to and from a grinding position with respect to the tire in response to the output grind signal from the memory circuit.

12. The combination as claimed in claim 11 including a delay circuit connecting the memory circuit and the servo mechanism to delay the transmission of the grind signal from the memory circuit to the servo mechanism and a means for timing the operation of the delay circuit in response to the rotation of the tire.

13. The combination as claimed in claim 12 wherein the delay circuit is a shift register and the timing means is a pulse tachometer.

14. The combination as claimed in claim 11 wherein the means to refresh the memory units is a multivibrator.

15. The combination as claimed in claim 10 wherein separate force variation measuring means are mounted adjacent to each shoulder rib of the tire and the signals of each measuring means separately control separate grinding wheels adjacent each shoulder rib of the tire.

16. A grinder control circuit comprising:

(A) a force transducer to measure force variations around the circumference of a circular rotating resilient body in contact therewith and convert such force variations to electrical signals;

(B) means amplifying the signals;

(C) a memory circuit for selecting and storing the signal from the amplifying means representative of a predetermined relative force level of the force variations around the circumference of the body during each revolution of the body;

(D) said memory circuit having two individual memory units which are arranged to be alternately refreshed with each successive revolution of the body;

(E) means controlling the rate at which the memory units are refreshed;

(F) a comparator circuit for comparing the stored signal from one of memory units with a varying signal from the amplifying means to provide an output signal when the stored signal and the varying signal differ by a predetermined amount; and (G) an electrically controlled servo mechanism for moving a grinding wheel to and from a grinding position with respect to the rotatable body in response to the output signal from the comparator circuit so that the grinding wheel may selectively grind off portions of the rotatable body and correct the force variations therearound.

17. A grinder control circuit as claimed in claim 16 including a delay circuit connecting the memory circuit and the servo mechanism to delay the transmission of the grind signal from the memory circuit to the servo mechanism and a means for timing the operation of the delay circuit in response to the rotation of the body.

18. A grinder control circuit as claimed in claim 17 wherein the delay circuit is a shift register and the timing means is a pulse tachometer.

References Cited

UNITED STATES PATENTS

| | | | |
|---|---|---|---|
| 2,079,585 | 5/1937 | Sloman | 73—146 |
| 2,695,520 | 11/1954 | Karsai | 73—146 |
| 2,731,887 | 1/1956 | Sjostrand | 90—11 |
| 2,765,845 | 10/1956 | Bullis | 157—13 |
| 2,766,563 | 10/1956 | Bennett | 51—33X |
| 2,897,882 | 8/1959 | Barrett | 157—13 |
| 2,918,116 | 12/1959 | Mooney | 157—13 |
| 2,924,048 | 2/1960 | Sjostrand | 51—165 |
| 2,966,011 | 12/1960 | Peacock | 51—33 |
| 2,869,362 | 1/1959 | Gough et al. | 73—146 |
| 2,920,481 | 1/1960 | Hulswit et al. | 73—146 |
| 3,060,733 | 10/1962 | Herzegh | 73—146 |
| 3,375,714 | 4/1968 | Bottasso | 73—146 |

LESTER M. SWINGLE, Primary Examiner

U.S. Cl. X.R.

51—106, 281; 157—13

PO-1050
(5/69)

UNITED STATES PATENT OFFICE
CERTIFICATE OF CORRECTION

Patent No. __3,553,903__    Dated __January 12, 1971__

Inventor(s) __William C Christie__

It is certified that error appears in the above-identified patent and that said Letters Patent are hereby corrected as shown below:

Column 6, line 74, "memories 37 and 38 is at the proper valve corre- by" should read --memory 37 is momentarily shorted to ground, thereby--.

Column 8, line 14, before "such" insert --other--.

Signed and sealed this 1st day of June 1971.

(SEAL)
Attest:

EDWARD M. FLETCHER, JR.
Attesting Officer

WILLIAM E. SCHUYLER, JR.
Commissioner of Patents